June 9, 1931.  P. J. SWIGART  1,809,607
DEVICE FOR HOLDING AND APPLYING TWINE
Filed Aug. 16, 1926

INVENTOR.
Philip J. Swigart

Patented June 9, 1931

1,809,607

UNITED STATES PATENT OFFICE

PHILIP J. SWIGART, OF AKRON, OHIO

DEVICE FOR HOLDING AND APPLYING TWINE

Application filed August 16, 1926. Serial No. 129,629.

This invention relates to new and novel improvements in devices for holding and applying twine and while intended for use generally wherever it may be advantageously applied, it is particularly adapted for use in applying twine around packages in which connection it will be herein illustrated and described.

Objects of the invention are to provide a twine holding and applying device of simple, durable construction, which may be manufactured at a low cost and which in use will provide convenient means for applying twine or any other elongated flexible member around a package or other article.

A further object is to provide a twine holding device having a cavity adapted to hold a ball of twine and having a handle through which the twine may be drawn from the ball and to provide improved means whereby friction may be conveniently applied to the twine during the operation and to thereby provide a twine wrapping device which may be conveniently used to apply twine under tension.

An additional object is to provide a holding and applying device of the class above indicated and to provide conveniently operable means for cutting the twine upon completion of the wrapping operation.

The above objects are accomplished and additional ends are attained by the novel construction, combination and arrangement of parts hereinafter described and illustrated in the accompanying drawings, in which I have shown one form of the invention, it being understood that the invention is capable of various adaptations and that changes and modifications may be made or resort had to substitutions which come within the scope of the appended claims.

In the drawings like characters of reference are employed to designate like parts as the same may appear in any of the several views and in which:—

Figure 1:
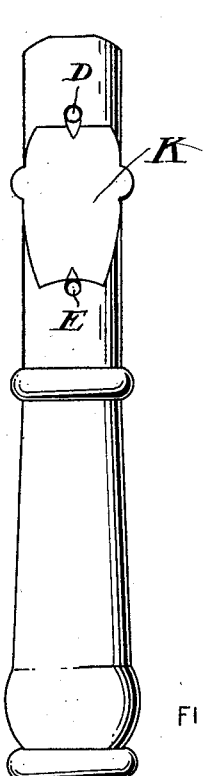
Figure 1 is a front elevational view of a twine holding and applying device constructed in accordance with this invention.
Figure 2:
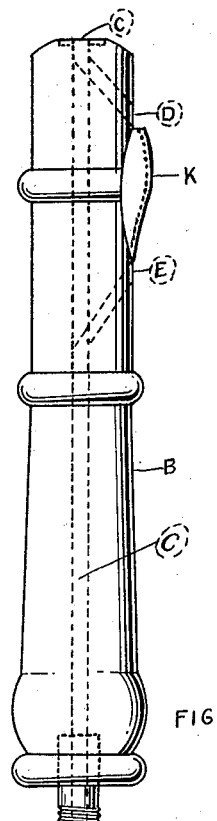
Figure 2 is a side elevational view of the handle portion of said device illustrating by dotted lines the twine passage-ways therein.
Figure 5:
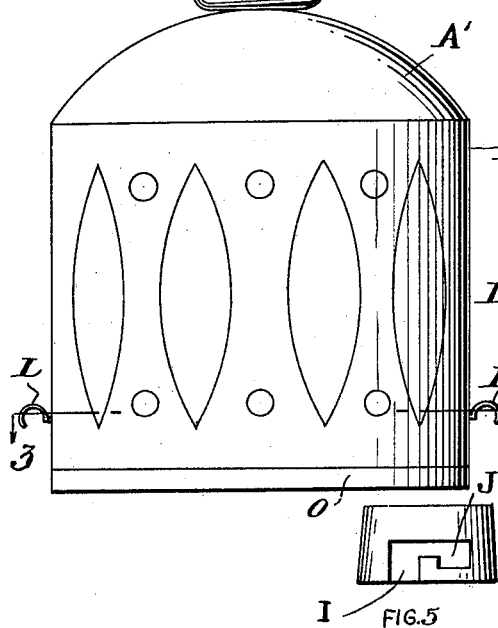
Figure 5 is a fragmentary view showing the bayonet slot employed in securing the cover to the main body of the holding device.
Figures 3, 4:
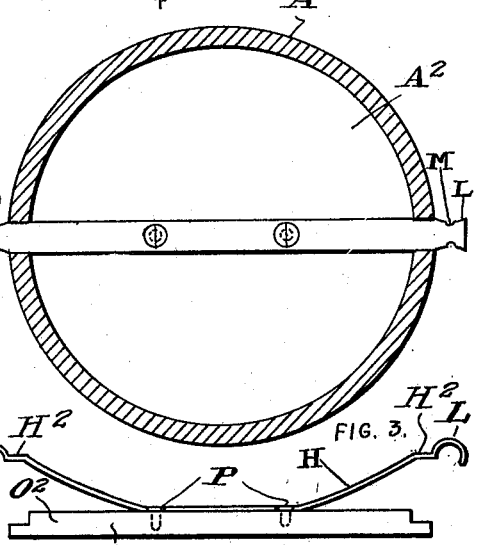
Figure 3 is a cross sectional view taken as indicated by the lines 3—3 of Figure 1.
Figure 4 is an edge view of the cover employed in carrying out the invention.

Proceeding now to a detailed description of the invention with reference to the particular adaptation thereof shown in the drawings, the character A is used to denote the main body of the device. The body A is in the form of a cylindrical cup having a dome-shaped upper wall A1. The body A is preferably formed of cylindrical shape providing a cylindrical cavity A2 which is adapted to hold a ball of twine.

The wall of the body A is provided at the lower edge thereof on diametrically opposite sides thereof with bayonet slots I which terminate at the upper end thereof with the downward extension J. O denotes a cover which is circular in form and is substantially of the same outside diameter as the body A. The cover O is provided on the inner face thereof with an inwardly projecting cylindrical portion O2 which is adapted to fit in the cavity A2 of the body A.

The numeral H denotes an elongated member which is secured to the inner face of the cover O by means of the rivets P so as to extend diametrically thereacross. The member H is flared upwardly at each end thereof to a point in the cylindrical plane of the reduced portion O2. The member H is then extended to form a horizontal portion H2 and terminates in a downwardly curved hook L. The hook L is provided on each lateral side thereof with a notch M and is provided at the notch M with a sharp knife edge. The handle B is provided with an axial bore B2 which extends diametrically therethrough. The bore B2 is enlarged adjacent the lower end thereof to receive the hollow screw plug F which is fitted in a bore in the top A1 to secure the handle B to the body A. The bore B2 extends through the plug F and communicates with the cavity A2 of the body A. The handle B is flattened at a point adjacent the upper end thereof and a pad K is suitably secured thereto. The character E denotes a bore which extends at a downward inclination into the handle B from a point immediately below the pad K and communicates with the bore B2. D indicates a like bore which extends into the handle B at a point immediately above the pad K and communicates with the bore C.

In use, a ball of twine is placed in the cavity A2 of the body A and the free end of the string is passed through the bore C and E and extends over the pad K and through the bore D issuing from the bore C at the free end of the handle B. The lid O is then placed over the bottom of the body A with the horizontal portions H2 entered in the slots I. The lid O is then rotated to move the member H into the horizontal portion of the slot I. As the member H is preferably made of spring steel, brass or similar material, it will snap downward into the extension J, thereby securely holding the lid in position on the body A.

In using a device constructed in accordance with this invention, the device is seized at the handle B. The free end of the string is held against the package and the entire holding device is passed around the package. The thumb is placed on the pad K so as to engage the string and hold the same in frictional contact with said pad. When the desired amount of twine has been used, the bottom of the device is tipped upwardly and the knife edge on one of the hooks L is employed to cut the twine thereby leaving a convenient length for tying.

While I have described my invention as applied to a device for holding twine, it is understood that the device may be used to apply any string, cord, or other flexible elongated member which is adapted to be used therewith.

Having thus illustrated my invention and described the same in detail, what I claim as new and desire to secure by Letters Patent is:—

1. In a device of the class described, a container, a handle projecting therefrom, said handle provided with a passage leading from said container to the free end thereof and means associated with the outer face of said handle to frictionally engage a string when the same is drawn through said passage, said handle provided with bores leading from the outer face of said handle to said passage, said bores positioned on opposite sides of said string engaging means.

2. In a device of the class described, a container, a handle projecting therefrom, a pad on said handle at a point adjacent the free end thereof, said handle provided with a longitudinally directed bore leading from said container and emerging from said handle at a point adjacent said pad, a second bore leading from a point on the other side of said pad to the free end of the handle, said container adapted to hold a ball of twine with the free end portion of the twine extending through said bores and contacting with said pad.

3. In a device of the class described, a container, a lid detachably secured to the bottom thereof and a handle projecting from the upper side thereof, said handle provided with a passage-way leading from said container and twine cutting means secured to said lid and projecting from the side of said container.

PHILIP J. SWIGART.